May 24, 1949.  A. L. SHAPIRO  2,471,011
BATTERY CHARGER AND RECTIFIER THEREFOR
Filed Dec. 19, 1946  3 Sheets-Sheet 1

INVENTOR.
ARTHUR L. SHAPIRO
BY
Harry H. Hitzeman
ATTORNEY.

May 24, 1949.　　　　A. L. SHAPIRO　　　2,471,011
BATTERY CHARGER AND RECTIFIER THEREFOR

Filed Dec. 19, 1946　　　　　　　　　　3 Sheets-Sheet 2

INVENTOR.
ARTHUR L. SHAPIRO
BY
Harry N. Hitzeman
ATTORNEY.

May 24, 1949.  A. L. SHAPIRO  2,471,011
BATTERY CHARGER AND RECTIFIER THEREFOR
Filed Dec. 19, 1946   3 Sheets-Sheet 3

INVENTOR.
ARTHUR L. SHAPIRO
BY
Harry H. Hitzeman
ATTORNEY.

Patented May 24, 1949

2,471,011

UNITED STATES PATENT OFFICE 2,471,011

BATTERY CHARGER AND RECTIFIER THEREFOR

Arthur L. Shapiro, Wilmette, Ill.

Application December 19, 1946, Serial No. 717,176

7 Claims. (Cl. 175—363)

My invention relates to improvements in battery chargers and rectifying units for the same.

My invention relates more particularly to a comparatively simple type of battery charger of the type which includes rectifier plates and is capable of being connected to the usual 110 volt current for the purpose of charging the usual 6 volt automobile battery.

The principal object of the present invention is to provide a battery charger and rectifier therefor of a new and simple design which is so constructed that it can be easily suspended in the home or a garage plugged into 110 volt A. C. circuit and have its leads attached to a battery for charging the same.

A further object of the invention is to provide a battery charger of the type described which contemplates the use of a plurality of selenium discs mounted upon an aluminum plate, the discs being separately positioned thereon at spaced intervals so that the maximum cooling, because of greater surface dissipation, can take place especially at the juncture of the rectifier discs on the aluminum plate.

A further object of the invention is to provide a construction of the type described whereby a greater output of power is capable from a given number of selenium discs, for the reason that the discs are separately or individually mounted upon the aluminum plate instead of being positioned in stacks as heretofore has been done.

A further object of the invention is to provide a rectifier plate and disc construction for battery chargers or other purposes that is more efficient than those produced in the past by reason of the disposition of the selenium discs upon the aluminum or other plate which I employ.

Other objects and advantages will be more apparent from the following description, wherein reference may be had to the accompanying three sheets of drawings upon which:

Figure 1:
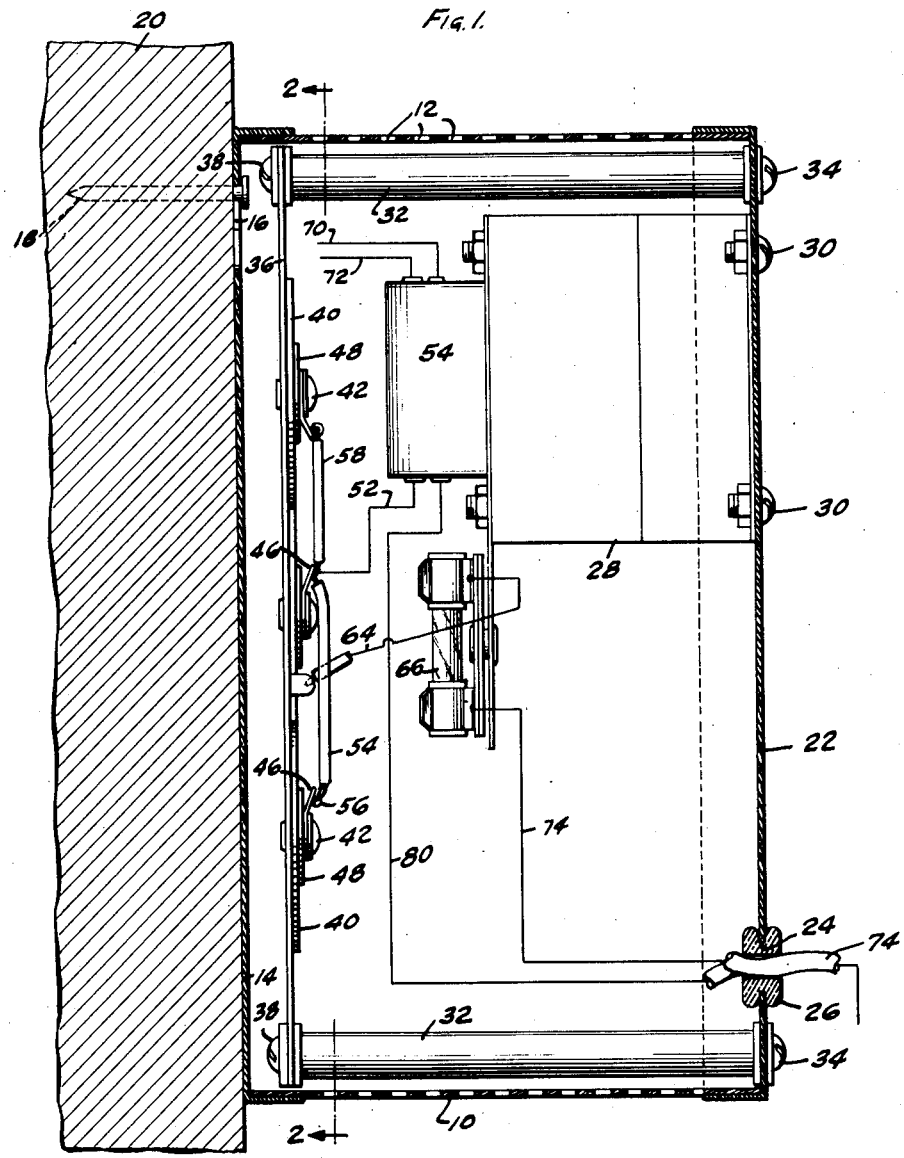
Fig. 1 is a vertical sectional view through a battery charger and rectifier therefor constructed in accordance with my invention.

In the embodiment of the invention which I have chosen to illustrate and describe in Fig. 1, I have shown a housing 10 which may be rectangular in shape and preferably constructed of aluminum or other sheet metal that is provided with a plurality of rows of slots 12 throughout its entire surface, so that any heat which is generated within the box can be easily dissipated therefrom. The box may have a back cover plate 14 secured thereto by screw members or other suitable fastening means. The back cover plate also having an opening 16 therein, so that the box may be suitably suspended upon a nail 18 or other suitable member fastened to a wall 20.

The front cover plate 22 may be generally similar to the back cover plate 14, being provided adjacent its lower end with the pair of openings 24 to receive the rubber washer members 26 through which the electrical cords of the conduit extending to the plug and to the battery terminal clamps may be extended. I mount a transformer 28 upon the front plate 22 being positioned thereon by means of bolt and nut members 30. I also provide four binding posts 32 secured to the front plate 22 by the screw members 34. The binding posts 32 supporting near the back of the cabinet a back plate 36, the same being fastened thereto by the screw members 38.

Figure 2:
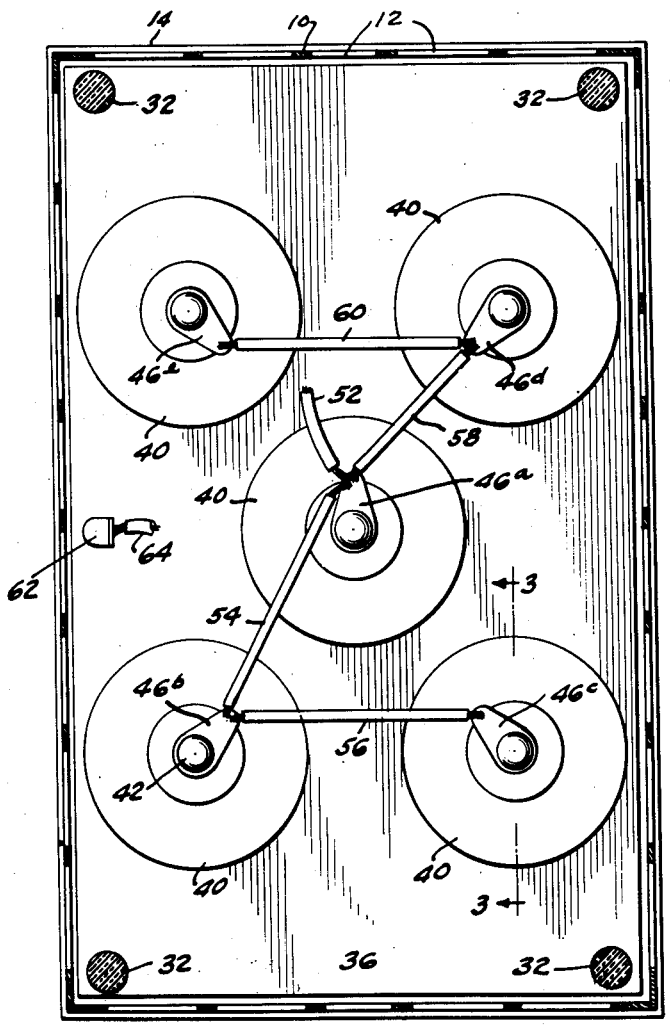
Fig. 2 is a sectional view looking at the rectifier mounting plate and selenium discs and is taken generally on the line 2—2 of Fig. 1.
Figure 3:
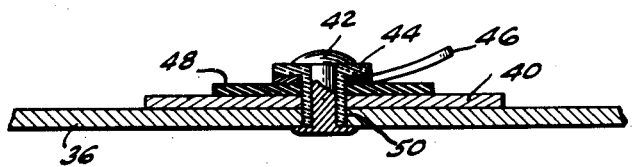
Fig. 3 is an enlarged sectional view showing the mounting of one of the selenium rectifier discs and is taken on the line 3—3 of Fig. 2.

Referring now to Figs. 2 and 3, the back plate 36 may provide a mounting for the rectifier discs 40. In the construction which I have shown the rectifier discs may be preferably made of selenium having a suitable coating thereon. Each of the discs is held in position on the back plate 36 by means of a rivet member 42, the rivet member passing through an insulating grommet 44. A connector 46 and washer 48 is also mounted upon each post, the rivet 42 having its head flattened over after passing through the opening 50 in the back plate 36.

In the construction which I have shown I have provided the conduit 52 from the coil 54 of the transformer 28 extending to the connector 46a on the middle disc 40. From here the wire 54 extends to the connector 46b from where a wire 56 extends to the connector 46c. A similar wire 58 may extend from the connector 46d and a wire 60 may extend from the connector 46d to the connector 46e, thus connecting all five of the selenium rectifier discs shown to the transformer by means of the conduit 52. The connector 62 on the back plate 36 may be electrically connected to the opposite side of the transformer by means of a conduit 64, a fuse or circuit breaker 66 being provided at this point to prevent damage to the transformer from a misconnection of the battery clamps to the terminals of the same.

Figure 6:
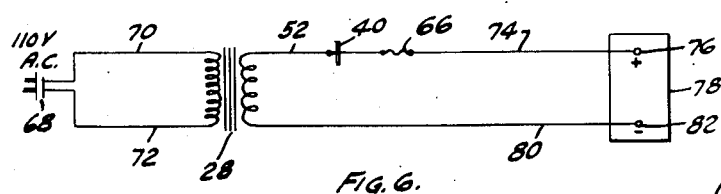
Fig. 6 is a circuit diagram of the electrical circuit which I employ in connection with the battery charger.

The circuit which is thus secured may be best shown in Fig. 6 wherein I provide a plug 68 to connect to the 110 volt A. C. circuit. The wire 70 and 72 may extend to the primary side of the transformer 28. The wire 52 may extend from the secondary side through the rectifier 40 the wire 64 extending from the back plate to the fuse 66, the wire 74 extending from the fuse or circuit breaker to the positive post 76 of a 6 volt storage battery 78. The other lead 80 from the secondary of the transformer extends to the negative post 82 of the battery to be charged.

With the circuit thus completed, I have provided a battery charger that transforms 110 volt alternating current by means of the transformer 28 and the rectifier so that it will charge a 6 volt battery at six amperes. Due to the separation of the selenium discs in the manner in which I have shown, or in any other arrangement which may be desirable so long as the discs are separately mounted on the backing plate, I have provided a construction wherein comparatively high efficiency is obtained and the heat which is created is easily dissipated. Due to mounting the discs separately upon the backing plate, greater efficiency is obtained from each disc than is possible where the discs are mounted in stacks. Due to the use of aluminum for a backing plate, I have found that the cooling of the same is greatly accelerated over other metals and in the preferred form of the invention aluminum will be employed.

Figure 4:
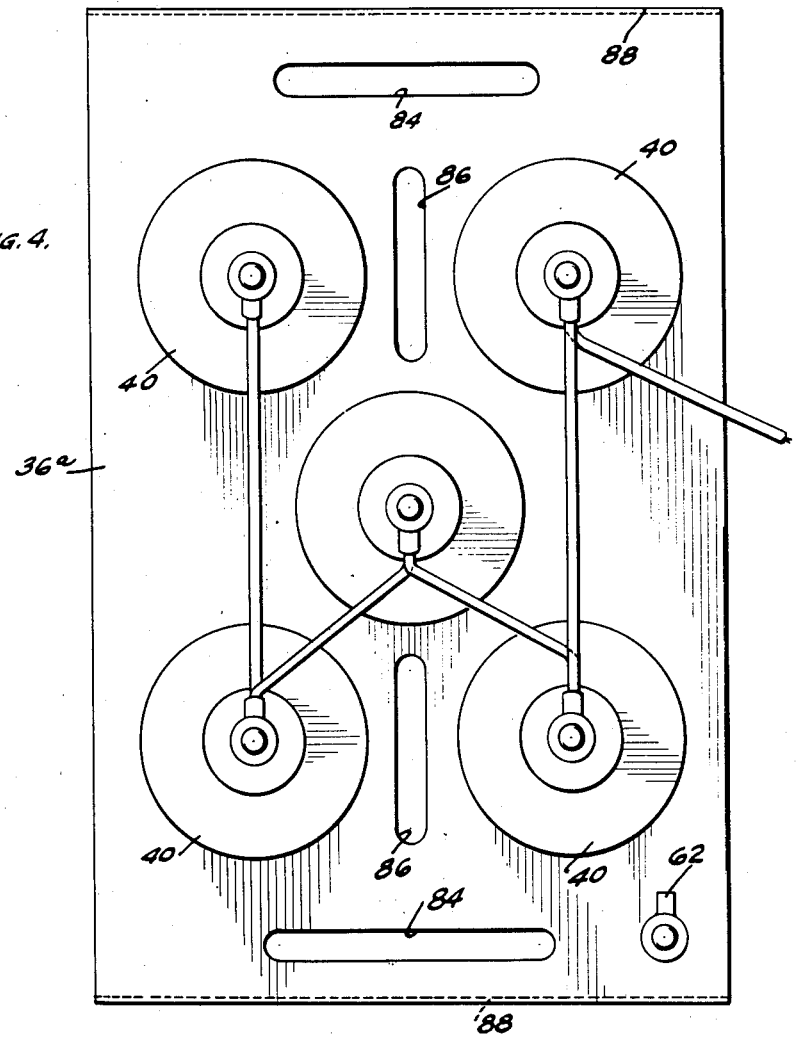
Fig. 4 is an elevational view of a modified form of back plate which I employ showing the rectifier discs mounted thereon.
Figure 5:
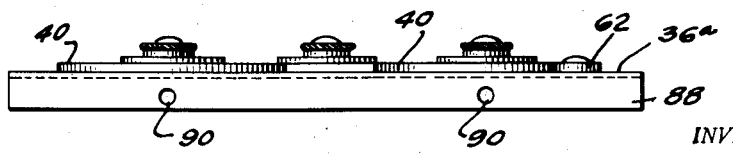
Fig. 5 is a side elevational view of the same.

In the embodiment of the invention shown in Figs. 4 and 5, I have provided a backing plate 36a upon which the selenium discs 40 may be mounted either in the arrangement shown or in any other suitable or desirable manner, so long as they are mounted separately upon the plate.

To assist in dissipating the heat produced I have provided a plurality of horizontal slots 84 and vertical slots 86 in the back plate 36a. The plate is also provided with the edge portions 88 that have holes 90 therein so that the plate may be rigidly mounted in a housing.

From the above and foregoing description it will be apparent to those skilled in the art that I have provided a comparatively simple battery charger and rectifier construction therefor. It is, of course, understood that by varying the number of discs or plates the voltage output may be increased or decreased. I have found that by separating the discs and mounting them individually, as shown, that the cost per unit of output obtained is comparatively cheaper than that of other constructions. By this construction the unit must be much smaller and more compact than other units on the market. The use of selenium discs instead of copper provides a longer life for the discs especially due to change in weather conditions wherein copper would be much more adversely affected. Because of the greater surface area exposed the operation of the device is much cooler than similar units wherein the plates are stacked and the heat is much more quickly dissipated especially at the juncture of the rectifier discs and the back plate.

I contemplate that changes and modifications may be made in the exact details shown, and I do not wish to be limited in any particular; rather what I desire to secure and protect by Letters Patent of the United States is:

1. A battery charger of the type described comprising a housing having a back cover plate and a front cover plate, a transformer mounted on said front cover plate, a plurailty of binding posts extending back from said front cover plate, a rectifying unit mounted on said binding posts, said unit comprising a back plate and a plurality of rectifier plates individually mounted on said back plate.

2. A battery charger of the type described comprising a housing having a back cover plate and a front cover plate, a transformer mounted on said front cover plate, a plurality of binding posts extending back from said front cover plate, a rectifying unit mounted on said binding posts, said unit comprising a back plate and a plurality of rectifier plates individually mounted on said back plate, said rectifier plates in the form of discs electrically connected together.

3. A battery charger of the type described comprising a rectangularly shaped housing having a back cover plate and a front cover plate, a transformer mounted on said front cover plate, a plurality of binding posts extending back from said front cover plate, a rectifying unit mounted on said binding posts, said unit comprising rectangularly shaped back plate and a plurality of circular rectifier plates individually mounted on said back plate.

4. A battery charger of the type described comprising a rectangularly shaped housing having a back cover plate and a front cover plate, a transformer mounted on said front cover plate, a plurality of binding posts extending back from said front cover plate, a rectifying unit mounted on said binding posts, said unit comprising a rectangularly shaped back plate and a plurality of circular rectifier plates individually mounted on said back plate, said back plate being aluminum and said rectifier plates being selenium.

5. A battery charger of the type described comprising a housing formed of metal having a plurality of slots therein, a front cover plate for said housing, a transformer mounted on said front cover plate, a plurality of binding posts extending back from said front cover plate, a rectifying unit mounted on said binding posts, said unit comprising an aluminum back plate and a plurality of selenium rectifier plates individually mounted on said back plate.

6. A battery charger of the type described comprising a housing formed of metal having a plurality of slots therein, a front cover plate for said housing, a transformer mounted on said front cover plate, a plurality of binding posts extending back from said front cover plate, a rectifying unit mounted on said binding posts, said unit comprising an aluminum back plate and a plurality of selenium rectifier plates individually mounted on said back plate, said back plate having a plurality of slots therein between said rectifier plates for better heat dissipation.

7. A battery charger of the type described comprising a housing formed of metal having a plurality of slots therein, a front cover plate for said housing, a transformer mounted on said front cover plate, a plurality of binding posts extending back from said front cover plate, a rectifying unit mounted on said binding posts, said unit comprising an aluminum back plate and a plurality of selenium rectifier plates individually mounted on said back plate, said back plate having a plurality of slots therein between said rectifier plates for better heat dissipation, said rectifier plates arranged with one centrally disposed on said back plate and the others disposed at an equal distance around the same.

ARTHUR L. SHAPIRO.

(References on following page)

REFERENCES CITED

The following references are of record in the file of this patent:

UNITED STATES PATENTS

| Number | Name | Date |
|---|---|---|
| 1,394,144 | Coolidge et al. | Oct. 18, 1921 |
| 1,709,866 | Mutscheller | Apr. 23, 1929 |
| 2,032,494 | Newhall et al. | Mar. 3, 1936 |
| 2,215,667 | Sherman | Sept. 24, 1940 |
| 2,338,907 | DeLange et al. | Jan. 11, 1944 |
| 2,353,461 | Hamann | July 11, 1944 |

FOREIGN PATENTS

| Number | Country | Date |
|---|---|---|
| 114,329 | Australia | Dec. 2, 1941 |